United States Patent
Kim et al.

(10) Patent No.: US 9,870,655 B2
(45) Date of Patent: Jan. 16, 2018

(54) APPARATUS AND METHOD FOR PROCESSING A PLURALITY OF LOGGING POLICIES

(71) Applicant: HYUNDAI MOTOR COMPANY, Seoul (KR)

(72) Inventors: Chul Min Kim, Suwon-si (KR); Dong Youl Lee, Yongin-si (KR); Young Su Kim, Yongin-si (KR); Jae Am Seo, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 105 days.

(21) Appl. No.: 14/814,127

(22) Filed: Jul. 30, 2015

(65) Prior Publication Data
US 2016/0171801 A1  Jun. 16, 2016

(30) Foreign Application Priority Data

Dec. 11, 2014 (KR) .......................... 10-2014-0178544

(51) Int. Cl.
*G05D 1/00* (2006.01)
*G07C 5/08* (2006.01)
(Continued)

(52) U.S. Cl.
CPC .......... *G07C 5/0841* (2013.01); *G06F 11/302* (2013.01); *G06F 11/3058* (2013.01);
(Continued)

(58) Field of Classification Search
CPC .. G06F 11/302; G06F 11/3058; G06F 11/323; G06F 17/2705; G06F 11/30;
(Continued)

(56) References Cited

U.S. PATENT DOCUMENTS 7,813,944 B1 * 10/2010 Luk .................. G06Q 40/08
705/2
2005/0187881 A1 * 8/2005 McGiffin ............. G06Q 20/382
705/64

(Continued)

FOREIGN PATENT DOCUMENTS

JP 2007-257049 A 10/2007
KR 10-0576725 B1 5/2006
(Continued)

*Primary Examiner* — Muhammad Shafi
(74) *Attorney, Agent, or Firm* — McDermott Will & Emery LLP

(57) ABSTRACT

An apparatus for processing a plurality of logging policies includes: a logging policy input unit configured to receive the plurality of logging policies for vehicle data; a logging policy storage configured to store the logging policies received by the logging policy input unit; a logging policy analyzer configured to parse the logging policies stored in the logging policy storage and extract variables from the parsed logging policies; a rule maker configured to make a logging policy applying rule based on the variables extracted by the logging policy analyzer; and a logging policy processor configured to read and process the corresponding logging policy which is stored in the logging policy storage depending on the logging policy applying rule made by the rule maker.

16 Claims, 4 Drawing Sheets

(51) Int. Cl.
*G06F 11/30* (2006.01)
*G06F 11/32* (2006.01)
*G06F 17/27* (2006.01)

(52) U.S. Cl.
CPC ........ *G06F 11/323* (2013.01); *G06F 17/2705* (2013.01); *G07C 5/0825* (2013.01); *G07C 5/085* (2013.01)

(58) Field of Classification Search
CPC ....... G06F 11/32; G06F 17/27; G07C 5/0825; G07C 5/0841; G07C 5/08
USPC .................................................. 701/1; 791/1
See application file for complete search history.

(56) References Cited

U.S. PATENT DOCUMENTS

| | | | |
|---|---|---|---|
| 2007/0220139 A1 | 9/2007 | Ohta et al. | |
| 2010/0144334 A1* | 6/2010 | Gorokhov | H04L 5/0035 455/418 |
| 2011/0138042 A1 | 6/2011 | Ohta et al. | |
| 2014/0310359 A1 | 10/2014 | Kim et al. | |

FOREIGN PATENT DOCUMENTS

| | | |
|---|---|---|
| KR | 10-2008-0047826 A | 5/2008 |
| KR | 10-2011-0044126 A | 4/2011 |
| KR | 10-2013-0096617 A | 8/2013 |
| KR | 10-1318990 B1 | 10/2013 |
| KR | 10-1439018 B1 | 9/2014 |
| KR | 10-2014-0115901 A | 10/2014 |

* cited by examiner

APPARATUS AND METHOD FOR PROCESSING A PLURALITY OF LOGGING POLICIES

CROSS-REFERENCE TO RELATED APPLICATION

This application is based on and claims the benefit of priority to Korean Patent Application No. 10-2014-0178544, filed on Dec. 11, 2014 in the Korean Intellectual Property Office, the disclosure of which is incorporated herein in its entirety by reference.

TECHNICAL FIELD

The present disclosure relates to an apparatus and a method for processing a plurality of logging policies, and more particularly, to a technology of processing a plurality of logging policies for logging vehicle data (sensor data, control data, network data, and the like) without collision with one another.

BACKGROUND

Recently, for the purpose of quality enhancement of a vehicle, increase of differentiation of a new car, and improvement of various convenience services (public service, personalization service), a technology of logging various vehicle data (sensor data, control data, network data, and the like) generated at the time of an operation of a vehicle in real time has been developed.

The vehicle data include various kinds of control information and tuning information and are generated at a short time interval of a level of 10 to 100 ms and therefore it is reasonable to optionally log data depending on a use purpose rather than logging full set data, when unnecessary.

Therefore, it is preferable to optionally log data from a vehicle based on a logging policy by which data logging specifications (kind, logging time, logging period, logging method, priority, and the like of logging data) for optionally logging vehicle data depending on the use purpose are defined.

However, when a plurality of logging policies are applied to one vehicle under the multi users and the multi service environment, a collision situation between the logging policies may occur.

SUMMARY

The present disclosure has been made to solve the above-mentioned problems occurring in the prior art while advantages achieved by the prior art are maintained intact.

An aspect of the present disclosure provides an apparatus and a method for processing a plurality of logging policies capable of preventing a collision between a plurality of logging policies by verifying integrity of the plurality of logging policies made to log vehicle data and processing the plurality of verified logging policies depending on priority.

The foregoing and other objects, features, aspects and advantages of the present disclosure will be understood and become more apparent from the following detailed description of the present disclosure. Also, it can be easily understood that the objects and advantages of the present disclosure can be realized by the units and combinations thereof recited in the claims.

According to an exemplary embodiment of the present disclosure, an apparatus for processing a plurality of logging policies, includes: a logging policy input unit configured to receive the plurality of logging policies for vehicle data; a logging policy storage configured to store the logging policies received by the logging policy input unit; a logging policy analyzer configured to parse the logging policies stored in the logging policy storage and extract variables from the parsed logging policies; a rule maker configured to make a logging policy applying rule based on the variables extracted by the logging policy analyzer; and a logging policy processor configured to read and process the corresponding logging policy which is stored in the logging policy storage depending on the logging policy applying rule made by the rule maker.

According to another exemplary embodiment of the present disclosure, a method for processing a plurality of logging policies, includes: receiving, by a logging policy input unit, the plurality of logging policies for vehicle data; storing, by a logging policy storage, the received logging policies; parsing, by a logging policy analyzer, the logging policies stored in the logging policy storage and extracting variables from the parsed logging policies; making, by a rule maker, a logging policy applying rule based on the extracted variables; and reading and processing, by a logging policy processor, the corresponding logging policy stored in the logging policy storage depending on the made logging policy applying rule.

In performing an integrity check on the plurality of logging policies made to log the vehicle data, a primary check may be performed based on profile information of the logging policies and a secondary check may be performed on the logging policy passing the primary check based on contents information of the logging policy.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
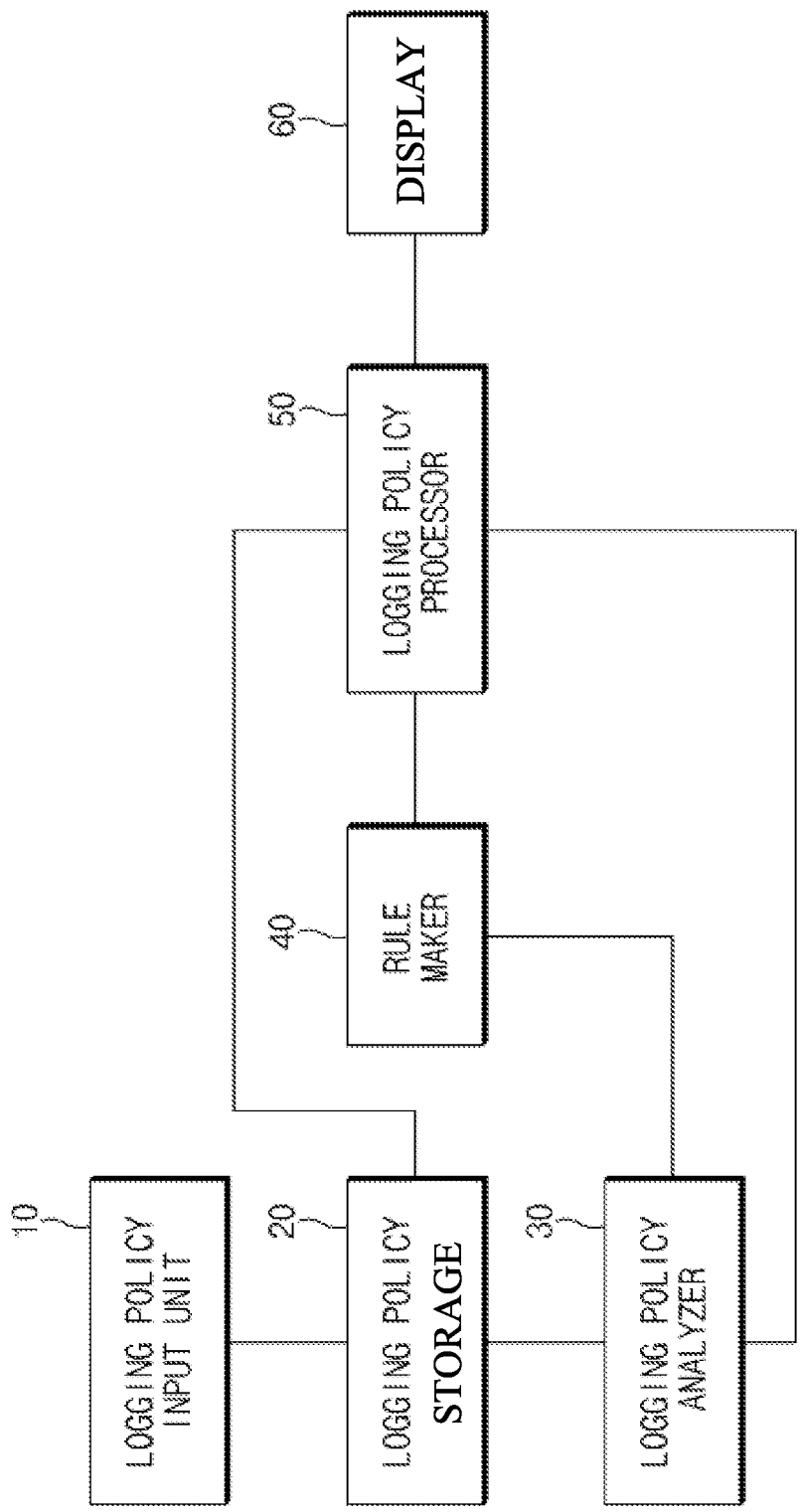
FIG. 1 is a configuration diagram of an apparatus for processing a plurality of logging policies according to an exemplary embodiment of the present disclosure.

FIG. 1 is a configuration diagram of an apparatus for processing a plurality of logging policies according to an exemplary embodiment of the present disclosure.

As illustrated in FIG. 1, an apparatus for processing a plurality of logging policies according to an exemplary embodiment of the present disclosure is an apparatus which is equipped in a vehicle to process a plurality of logging policies which are applied to the vehicle and includes a logging policy input unit 10, a logging policy storage 20, a logging policy analyzer 30, a rule maker 40, a logging policy processor 50, and a display 60.

Describing each component, the logging policy input unit 10 first receives a logging policy for vehicle data generated from a server or a terminal, performs a primary integrity check of the received logging policy, and tags identification (ID) to the logging policy passing the primary integrity check. In this case, the logging policy input unit 10 immediately discards the logging policy which does not pass the primary integrity check without tagging the ID to the logging policy.

Here, the logging policy is a policy file in a script form and includes policy profile information, variable information used to determine an application timing of the policies, and policy information used to log the vehicle data. In this case, the policy profile information is information which may be confirmed without parsing, and includes a car model a development stage (fast, proto, pilot, master), and a software version which is an object of the primary integrity check along with a policy name, a purpose, a generation date, a size, and the like. The variable information is information which may be confirmed by parsing, and includes priority, application timing (year/month/day/hour/minute/second), application time (for example, 10 seconds, 1 minute, 10 minutes, and the like), an application period, and a transition condition. The policy information is also information which may be confirmed by the parsing, and includes a kind and characteristics of vehicle data to be logged, a kind of vehicle network, topology (the number of CAN channels, data base computer (DBC) file version, and the like), a method for logging vehicle data, and the like. In this case, the vehicle network includes a controller area network (CAN), a local interconnect network (LIN), a FlexRay, a media oriented system transport (MOST), and the like.

Further, the logging policy input unit 10 needs to perform the following three steps to perform the primary integrity check on the received logging policies.

In a first step, the logging policy input unit 10 determines whether the logging policy is normally generated from a previously authenticated source. For example, it is possible to authenticate the logging policy by using a certificate of the logging policy, a security key encrypting the logging policy itself, or the like.

In a second step, the logging policy input unit 10 determines whether the logging policy has appropriateness based on the car model, the development stage (fast, proto, pilot, master) and a software version among the profile information which may be confirmed without the parsing. That is, when the car model, the development stage, and the software version of the targeted vehicle are the same as the car model, the development stage, and the software version of the received logging policy by the comparison, the logging policy input unit 10 determines that the logging policy is appropriate.

For example, if the car model to which the logging policy is applied is 'Genesis' and the car model of the received logging policy is 'Equus', the logging policy input unit 10 determines that the logging policy is not appropriate.

As another example, if the development stage of the vehicle to which the logging policy is applied is 'master' and the development stage of the received logging policy is 'proto', the logging policy input unit 10 also determines that the logging policy is not appropriate.

In a third step, a redundancy check is performed on whether the same logging policy is present, based on the profile information which may be confirmed without the parsing. That is, if the logging policy input unit 10 determines that there is the same logging policy file by confirming whether the same logging policy file is present, the received logging policy is discarded by the logging policy input unit 10.

The logging policy storage 20 stores the logging policies to which IDs are tagged by the logging policy input unit 10. In this case, the logging policy storage 20 stores the logging policies in various forms such as a file retriever form or a database form.

The logging policy analyzer 30 parses the logging policies which are stored in the logging policy storage 20 and performs a secondary integrity check based on the parsed result. That is, the logging policy analyzer 30 performs a grammar check for detecting a structural error of the logging policy file in the script form as the secondary integrity check, performs contents check for verifying a result of the primary integrity check, and extracts variables required for scheduling so as to prevent a collision between the plurality of logging policies.

The rule maker 40 makes a logging policy applying rule based on the variables extracted by the logging policy analyzer 30. In this case, the variables include priority, application timing, application time, an application period, a transition condition, and the like.

Here, the logging policy applying rule may be made based on a scheduler scheme or a look-up table scheme. In this case, the scheduler scheme includes priority, application time, and a transition condition, and the look-up table scheme includes priority, application time, and application period.

The rule maker 40 reads a rule template (scheduling algorithm or look-up table type) which is stored in a rule template database (DB) (not illustrated) and may also include a rule maker (not illustrated) which applies the variables extracted by the logging policy analyzer 30 to the rule template to make the logging policy applying rule.

The logging policy processor 50 reads and processes the corresponding logging policy which is stored in the logging policy storage 20 depending on the logging policy applying rule made by the rule maker 40.

For example, the logging policy processor 50 assumes that the logging policy applying rule is as the following [Table 1].

TABLE 1

| Policy ID | Priority | Application time | Application period |
|---|---|---|---|
| 001 | 2 | 10 seconds | 3 minutes |
| 002 | 1 | 1 second | 30 seconds |
| 003 | 3 | 1 minute | 5 minutes |

Generally, policies are applied in an order of 002, 001, and 003 of high priority. When the application period of 002 arrives in a state in which 001 is applied, 001 is held and then 002 is applied and when the application time of 002 is completed, the application of 002 is again resumed. That is, when the application period of a policy having high priority arrives in a state in which a policy having low priority is applied, the policy having the low priority is held and the policy having the high priority is first applied.

Meanwhile, the logging policy processor 50 may confirm the policy information within the logging policy file with the help of the logging policy analyzer 30.

The display 60 displays the logging policy applied to the vehicle by the logging policy processor 50 on a screen.

The exemplary embodiment of the present disclosure describes an example in which the logging policy analyzer 30, the rule maker 40, and the logging policy processor 50 are implemented in a separate configuration, but the logging policy analyzer 30, the rule maker 40, and the logging policy processor 50 may be implemented to be integrated as one control module.

Figure 2:
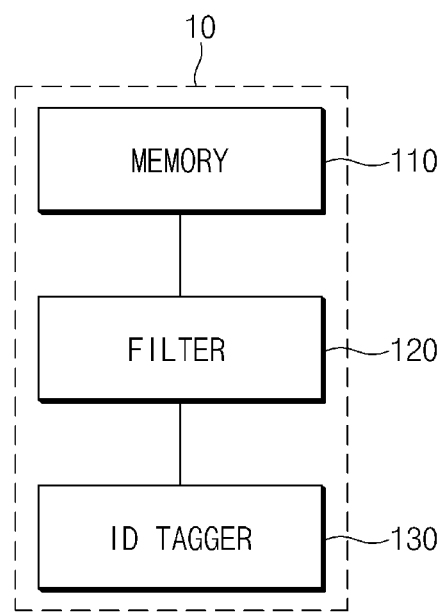
FIG. 2 is a configuration diagram of a logging policy input unit according to an exemplary embodiment of the present disclosure.

FIG. 2 is a configuration diagram of a logging policy input unit according to an exemplary embodiment of the present disclosure.

As illustrated in FIG. 2, the logging policy input unit 10 according to the exemplary embodiment of the present disclosure includes a memory 100, a filter 120, and an ID tagger 130.

First, the memory 110 may be preferably implemented in a queue form and temporarily stores the logging policy (policy file in a script form) which is input from a terminal or a server.

The filter 120 authenticates the logging policy output from the memory 110 and performs the redundancy check along with the primary integrity check.

The ID tagger 130 tags the ID to the logging policy normally passing the filter 120. That is, the ID tagger 130 tags the ID to the logging policy which is authenticated, is proved as the primary integrity, and is not redundant.

Figure 3:
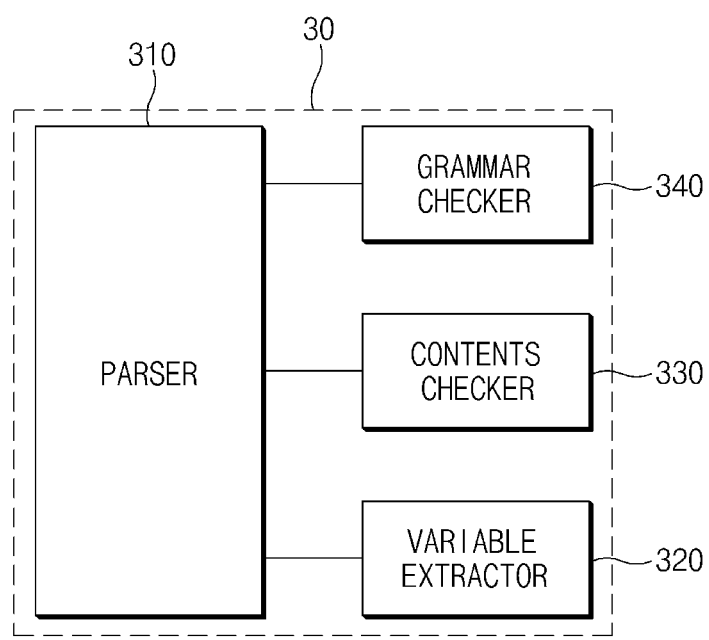
FIG. 3 is a configuration diagram of a logging policy analyzer according to an exemplary embodiment of the present disclosure.

FIG. 3 is a configuration diagram of a logging policy analyzer according to an exemplary embodiment of the present disclosure.

As illustrated in FIG. 3, the logging policy analyzer according to the exemplary embodiment of the present disclosure includes a parser 310, a variables extractor 320, a contents checker 330, and a grammar checker 340.

First, the parser 310 parses the logging policies which are stored in the logging policy storage 20.

The variable extractor 320 extracts variables required to make a rule from the logging policy parsed by the parser 310.

The contents checker 330 performs the contents check for verifying the result of the primary integrity check which is performed by the logging policy input unit 10.

The grammar checker 340 performs the grammar check for detecting the structural error of the logging policy file in the script form.

Figure 4:
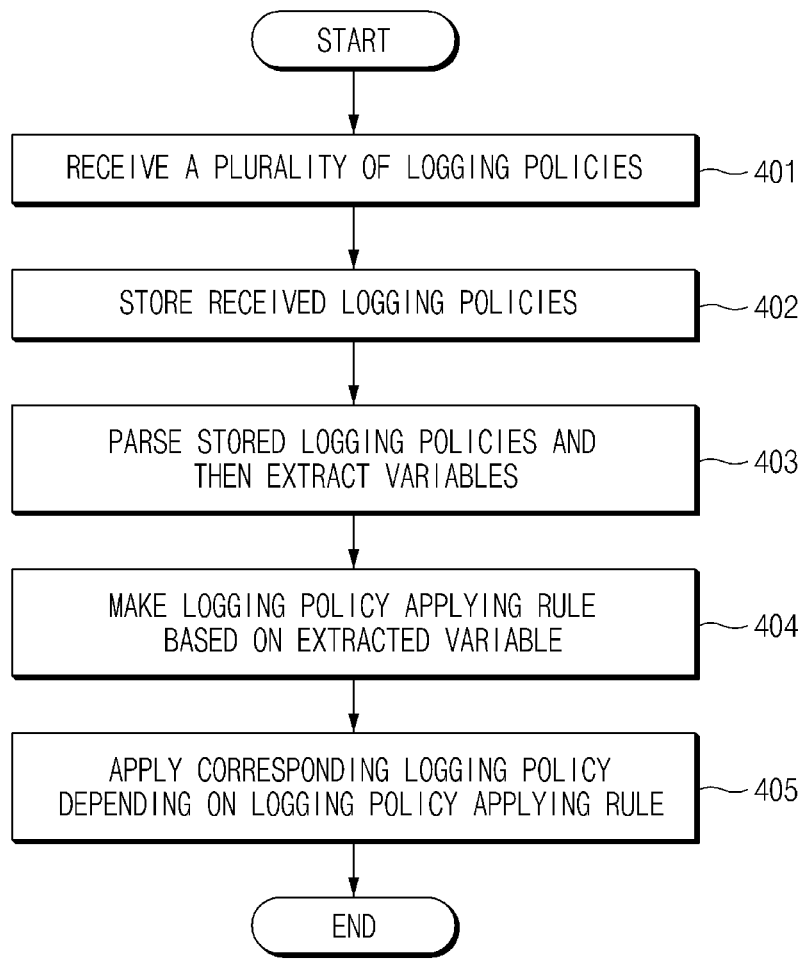
FIG. 4 is a flow chart of a method for processing a plurality of logging policies according to an exemplary embodiment of the present disclosure.

FIG. 4 is a flow chart of a method for processing a plurality of logging policies according to an exemplary embodiment of the present disclosure.

First, the logging policy input unit 10 receives the plurality of logging policies for vehicle data from the terminal or the server (401).

Next, the logging policy storage 20 stores the logging policies which are input by the logging policy input unit 10 (402).

Next, the logging policy analyzer 30 parses the logging policies stored in the logging policy storage 20 and then extracts the variables (403).

Next, the rule maker 40 makes a logging policy applying rule based on the variables extracted by the logging policy analyzer 30 (404).

Next, the logging policy processor 50 reads and processes the corresponding logging policy which is stored in the logging policy storage 20 depending on the logging policy applying rule made by the rule maker 40. That is, the logging policy processor 50 applies the corresponding logging policy to the vehicle depending on the logging policy applying rule.

It is preferable to apply the exemplary embodiment of the present disclosure as described above in the case in which the vehicle data logged by each logging policy are different, that is, when there is no vehicle data common among the vehicle data logged among the plurality of logging policies.

Meanwhile, the method according to the exemplary embodiment of the present disclosure as described above may be prepared by a computer program. Codes and code segments configuring the computer program may be easily deduced by computer programmers in the art. In addition, the computer program is stored in computer readable recording media (information storage media) and is read and executed by computers, thereby implementing the methods according to the present disclosure. Further, the recording medium may include any type of recording media which may be read by a computer.

As described above, according to the exemplary embodiments of the present disclosure, it is possible to prevent the collision between the plurality of logging policies by verifying the integrity of the plurality of logging policies made to log the vehicle data and processing the plurality of verified logging policies depending on priority.

Further, according to the exemplary embodiments of the present disclosure, it is possible to prevent the collision between the plurality of logging policies by holding the policy having the low priority and then first processing the policy having the high priority when the application timing of the policy having the high priority arrives in the state in which the application of the policy having the low priority and releasing the holding after the processing of the policy having the high priority is completed.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. An apparatus for processing a plurality of logging policies, the logging policies defining data logging specifications for selectively collecting vehicle data according to purpose of using the vehicle data, the apparatus comprising:
   a logging policy input device configured to receive the plurality of logging policies for vehicle data, the plurality of logging policies being determined depending upon car models;
   a logging policy storage configured to store the logging policies received by the logging policy input unit; and
   a processor including:
      a logging policy analyzer configured to parse the logging policies stored in the logging policy storage and extract variables from the parsed logging policies;
      a rule maker configured to make a logging policy applying rule based on the variables extracted by the logging policy analyzer; and
      a logging policy processor configured to read and process the corresponding logging policy which is stored in the logging policy storage depending on the logging policy applying rule made by the rule maker in order to prevent a collision situation between the plurality of logging policies, when the plurality of logging policies are applied to one vehicle under multiple users and multiple service environment, wherein the logging policy input device includes:
- a memory configured to temporarily store the received logging policy;
- a filter configured to authenticate the logging policies stored in the memory and perform a primary integrity check and a redundancy check; and
- an ID tagger configured to tag IDs to the logging policies normally passing through the filter, and wherein, when an application period of a logging policy having a high priority arrives while a logging policy having a low priority is applied, the logging policy processor pauses applying the logging policy having the low priority and applies the logging policy having the high priority.

2. The apparatus according to claim 1, further comprising:
a display configured to display the logging policies applied to a vehicle by the logging policy processor on a screen.

3. The apparatus according to claim 1, wherein the rule maker applies the variables extracted by the logging policy analyzer to a rule template to make the logging policy applying rule.

4. The apparatus according to claim 1, wherein the logging policy is a policy file in a script form.

5. The apparatus according to claim 4, wherein the logging policy includes policy profile information, variable information used to determine an application timing of the policy, and policy information used to log the vehicle data.

6. The apparatus according to claim 5, wherein the policy profile information includes at least one of a car model, a development stage, and a software version.

7. The apparatus according to claim 5, wherein the variable information includes at least one of priority, application time, an application period, a transition condition.

8. The apparatus according to claim 5, wherein the policy information includes at least one of a kind and characteristics of the vehicle data to be logged, a kind of vehicle network, topology, and a method for logging vehicle data.

9. The apparatus according to claim 1, wherein the logging policy analyzer includes:
- a contents checker configured to perform a contents check to verify a result of the primary integrity check performed by the filter; and
- a grammar checker configured to perform a grammar check to detect a structural error of a policy file in a script form.

10. The apparatus according to claim 1, wherein the logging policy analyzer includes:
- a parser configured to parse the logging policies stored in the logging policy storage; and
- a variable extractor configured to extract the variables required to make a rule from the logging policies parsed by the parser.

11. A method for processing a plurality of logging policies, the logging policies defining data logging specifications for selectively collecting vehicle data according to purpose of using the vehicle data, the method being performed by a processor the method comprising:

receiving, by a logging policy input device, the plurality of logging policies for vehicle data, the plurality of logging policies being determined depending upon car models;

storing, by a logging policy storage, the received logging policies;

parsing, by the processor, the logging policies stored in the logging policy storage and extracting variables from the parsed logging policies;

making, by the processor, a logging policy applying rule based on the extracted variables; and reading and processing, by the processor, the corresponding logging policy stored in the logging policy storage depending on the made logging policy applying rule in order to prevent a collision situation between the plurality of logging policies, when the plurality of logging policies are applied to one vehicle under multiple users and multiple service environment;

wherein the receiving of the logging policies includes:
- temporarily storing the logging policies received by a memory;
- authenticating, by a filter, the logging policies stored in the memory and performing a primary integrity check and a redundancy check; and
- tagging, by an ID tagger, IDs to the logging policies normally passing through the filter, and wherein, when an application period of a logging policy having a high priority arrives while a logging policy having a low priority is applied, the logging policy processor pauses applying the logging policy having the low priority and applies the logging policy having the high priority.

12. The method according to claim 11, further comprising:
displaying, by a display, the logging policies applied to a vehicle by the processor on a screen.

13. The method according to claim 11, wherein in the making of the logging policy applying rule, the variables extracted by the processor are applied to a rule template to make the logging policy applying rule.

14. The method according to claim 11, wherein the logging policy is a policy file in a script form and includes policy profile information, variable information used to determine an application timing of the policy, and policy information used to log the vehicle data.

15. The method according to claim 11, wherein the parsing of the logging policies includes:
- parsing, by a parser, the logging policies stored in the logging policy storage; and
- extracting, by a variable extractor, the variables required to make a rule from the logging policies parsed by the parser.

16. The method according to claim 15, wherein the parsing of the logging policies includes:
- performing, by a contents checker, a contents check to verify a result of the primary integrity check performed by the filter; and
- performing, by a grammar checker, a grammar check to detect a structural error of a policy file in a script form.

* * * * *